US012806812B2

(12) United States Patent
Norman

(10) Patent No.: US 12,806,812 B2
(45) Date of Patent: Nov. 24, 2026

(54) BLADE FOR OSCILLATING POWER TOOL

(71) Applicant: C4 Carbides Limited, Newmarket (GB)

(72) Inventor: Christopher E. Norman, Newmarket (GB)

(73) Assignee: C4 Carbides Limited, Newmarket (GB)

(*) Notice: Subject to any disclaimer, the term of this patent is extended or adjusted under 35 U.S.C. 154(b) by 98 days.

(21) Appl. No.: 18/532,295

(22) Filed: Dec. 7, 2023

(65) Prior Publication Data

US 2024/0100726 A1 Mar. 28, 2024

Related U.S. Application Data

(63) Continuation of application No. PCT/GB2022/051177, filed on May 10, 2022.

(30) Foreign Application Priority Data

Jun. 10, 2021 (GB) ..................................... 2108286

(51) Int. Cl.

*B26D 1/00* (2006.01)
*B23D 61/00* (2006.01)
*B26D 1/25* (2006.01)

(52) U.S. Cl.

CPC ......... *B26D 1/0006* (2013.01); *B23D 61/006* (2013.01); *B26D 1/25* (2013.01); *B26D 2001/006* (2013.01)

(58) Field of Classification Search

CPC .... B23D 61/006; B23D 49/11; B26D 1/0006; B26D 1/25; B26D 1/26; B26D 1/30;

(Continued)

(56) References Cited

U.S. PATENT DOCUMENTS 3,768,349 A * 10/1973 Cauffiel ................. B23D 33/02 83/209
4,485,696 A * 12/1984 Bieganski ............ H02G 1/1212 81/9.41

(Continued)

FOREIGN PATENT DOCUMENTS

DE 102010040131 A1 3/2012
DE 202013004983 U1 5/2014

(Continued)

OTHER PUBLICATIONS

English language translation of DE-102013112888-A1 to Babian.*

(Continued)

*Primary Examiner* — Evan H Macfarlane

(74) *Attorney, Agent, or Firm* — Reinhart Boerner Van Deuren s.c.

(57) ABSTRACT

A blade for an oscillating power tool has an elongate body fixed to an attachment section. The elongate body is divided into two or more resiliently flexible tongue portions, and each tongue portion includes a cutting portion distal from the attachment section. A depth stop may be attached to the elongate body. There is also provided a method of using an oscillating power tool. In the method, a power tool is activated to oscillate a blade. The oscillating blade is inserted into a channel filled with material, and the power tool is twisted to cause the tongue portions to engage at least opposing walls of the channel.

19 Claims, 4 Drawing Sheets

(58) Field of Classification Search
CPC ...... B26D 2001/0053; B26D 2001/006; B27B 19/006; B27B 19/008
See application file for complete search history.

(56) References Cited

U.S. PATENT DOCUMENTS

| | | | | |
|---|---|---|---|---|
| 2002/0104421 | A1* | 8/2002 | Wurst | B23D 61/021<br>83/835 |
| 2006/0000338 | A1* | 1/2006 | Rankin | B26D 7/08<br>83/879 |
| 2007/0123893 | A1* | 5/2007 | O' Donoghue | A61B 17/142<br>606/82 |
| 2010/0262148 | A1 | 10/2010 | O'Donoghue | |
| 2014/0012265 | A1 | 1/2014 | Servidio | |
| 2014/0230626 | A1* | 8/2014 | Puzio | B26D 1/30<br>83/697 |
| 2015/0020671 | A1* | 1/2015 | Meindorfer | B26B 9/02<br>83/697 |
| 2016/0257010 | A1* | 9/2016 | Jones | B23D 51/10 |
| 2017/0157688 | A1* | 6/2017 | Turner | B23D 61/18 |
| 2017/0340338 | A1 | 11/2017 | Hassler, Jr. et al. | |
| 2021/0114125 | A1 | 4/2021 | Heath et al. | |
| 2024/0165723 | A1* | 5/2024 | Whitty | B23D 61/14 |

FOREIGN PATENT DOCUMENTS

| | | | | |
|---|---|---|---|---|
| DE | 102013112888 | A1 * | 5/2015 | B27B 19/006 |
| WO | WO2013074735 | A1 | 5/2013 | |
| WO | WO2014195173 | | 12/2014 | |

OTHER PUBLICATIONS

International Search Report and Written Opinion for International Application No. PCT/GB2022/051177, dated Aug. 16, 2022, 8 pages.
Search Report for GB Application No. 2108286.2, dated Nov. 30, 2021, 1 page.
One Fit Storm Titanium Wood & Nails Blade, https://imperialblades.com/product/iboat337-storm-wood-nails-blade/, known at least as early as Mar. 10, 2021.

* cited by examiner

BLADE FOR OSCILLATING POWER TOOL

CROSS-REFERENCE TO RELATED PATENT APPLICATION

This application is a continuation of PCT/GB2022/051177, filed May 10, 2022, which claims the benefit of and priority to GB Application No. 2108286.2, filed Jun. 10, 2021, which are incorporated herein by reference in their entireties.

FIELD OF THE INVENTION

This application relates to a blade for an oscillating power tool and in particular a blade for an oscillating multitool.

BACKGROUND TO THE INVENTION

Oscillating power tools have an output shaft that oscillates at high speed about an axis to which a blade is attachable, with oscillating multitools configured to be used with different types of attachments. Oscillating multitools can be used for a variety of different tasks such as sanding, cutting, grinding, polishing and grout removal.

SUMMARY OF THE INVENTION

In accordance with the invention there is provided a blade for an oscillating power tool comprising an elongate body fixed to an attachment section, which is typically connectable to an oscillating power tool, wherein the elongate body is divided into two or more resiliently flexible tongue portions, each tongue portion comprising a cutting portion distal from the attachment section. Such a blade as adapted to be used with an oscillating power tool, including an oscillating multitool, is able to remove grout, silicone or other filler materials from a channel, for example between adjacent tiles, bricks or slabs.

The tongue portions are preferably disposed in a common plane so as to be co-planar when the blade is not in use, and in use capable of independent flexible movement to lie in different planes, restoring to a co-planar rest position when not in use.

Preferably the elongate body has a longitudinal length extending from the attachment section to an outer edge of the cutting portion and each tongue portion has a length between 30 to 80% of the longitudinal length.

The elongate body is desirably between 0.5 to 3 mm thick and preferably made of carbon steel which assists with flexibility and enabling movement of the tongue portions with respect to each other.

The elongate body may comprise at least one slit, a tongue portion disposed on each side of the slit. If desired a plurality of slits may be provided, with for example two slits to create three tongue portions or three slits to divide the elongate body into four tongue portions.

Preferably the cutting portion comprises a circular arc and may comprise abrasive material such as particles of Tungsten Carbide or diamond.

A depth stop may be attached to the elongate body to limit depth of penetration of the blade, which is particularly of use when aiming to remove material to a partial depth rather than entirely remove material.

Preferably the depth stop is secured to at least two tongue portions.

In accordance with a further aspect of the invention, there is provided a method of using an oscillating power tool attached to a blade with two or more resiliently flexible tongue portions as aforesaid, the method comprising activating a power tool to oscillate a blade, inserting the oscillating blade into a channel filled with material, and twisting the power tool to cause at least two of the tongue portions to engage opposing walls of the channel. This creates deflection of the two or more tongue portions to at least partially extend laterally across the channel rather than the tongue portions just extending linearly along the channel.

BRIEF DESCRIPTION OF THE DRAWINGS

The invention will now be described, by way of example, with reference to the accompanying drawings in which.

DETAILED DESCRIPTION

Figure 1:
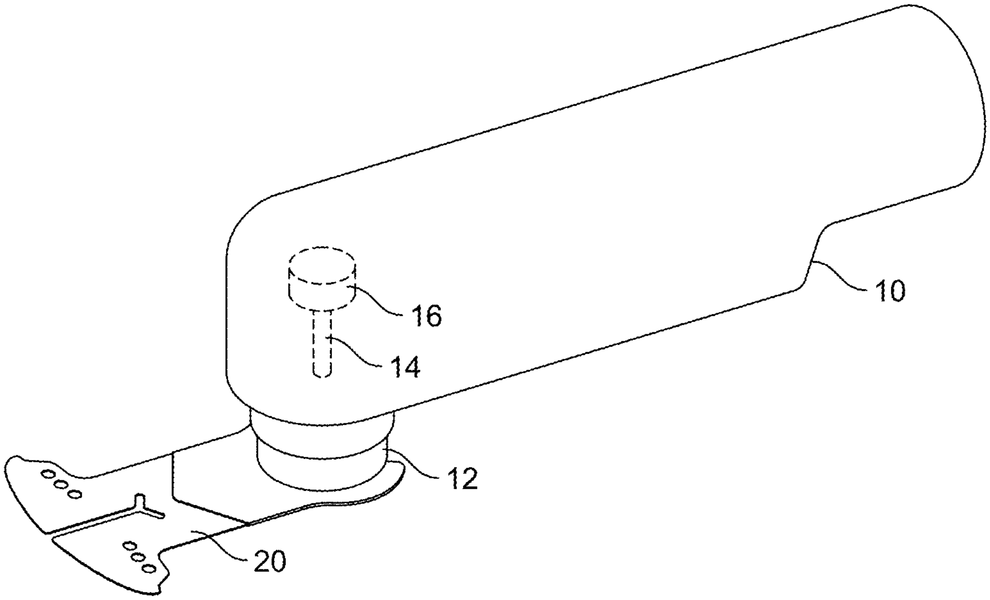
FIG. 1 is a schematic diagram of an oscillating power tool with blade.

An oscillating power tool 10, such as an oscillating multitool, is shown in FIG. 1 and comprises an attachment mechanism 12 for releasably securing different accessories to oscillating spindle 14 driven by motor 16. Blade 20 is shown connected to attachment mechanism 12.

Figure 2:
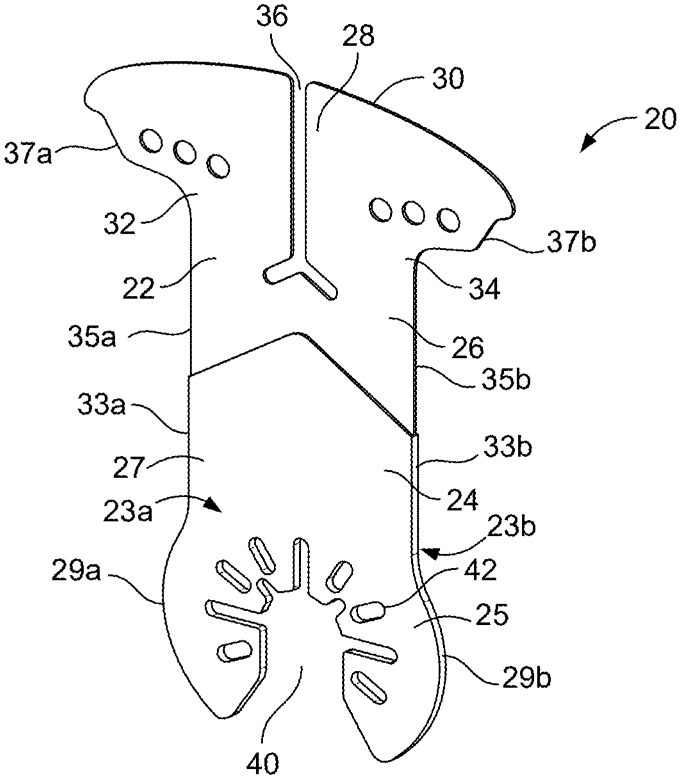
FIG. 2 is a perspective view of a first embodiment of a blade in accordance with the invention.

A first embodiment of blade 20 as shown in FIG. 2 comprises a first side 23*a* and a second side 23*b*, opposite to the first side 23*a*, that define an elongate body 22 and attachment section, or tang, 24 configured to secure to attachment mechanism 12. The attachment section 24 includes a first region 25 and a second region 27. The first region 25 has first opposing curved edges 29*a*, 29*b*, and the second region 27 has first opposing straight edges 33*a*, 33*b*. Elongate body 22 is substantially T-shaped comprising elongate portion 26 and cutting portion 28 shaped as a circular segment and positioned at an upper end of elongate portion 26 distal from attachment section 24. The elongate portion 26 has second opposing straight edges 35*a*, 35*b*. Cutting portion 28 has opposing edges 37*a*, 37*b* that increase in width and extends beyond the sides second opposing straight edges 35*a*, 35*b* of elongate portion 26. The cutting portion 28 and comprises an outer curved cutting edge 30 on which abrasive material, for example particles 31 of Tungsten Carbide or diamond, is typically deposited, see FIG. 3.

Cutting portion 28 is split centrally into two tongue sections 32, 34 by slit 36 extending from outer cutting edge 30 towards attachment section 24, slit 36 reaching approximately two-thirds down elongate body 22, and thus approximately two-thirds down the longitudinal length of elongate body 22. Tongue sections 32, 34 are resiliently flexible and co-planar at rest as shown in FIG. 2, capable of being flexed independently to lie temporarily in different planes and then restoring to their rest position. Elongate body 22 is typically made from 1 mm thick carbon steel, with elongate portion 26 around 20 mm wide and cutting portion 28 around 75 mm wide.

Attachment section 24 is formed with a plurality of apertures 40, 42 configured in a pattern which enables securing to attachment mechanism 12 of oscillating tool 10.

Figure 3:
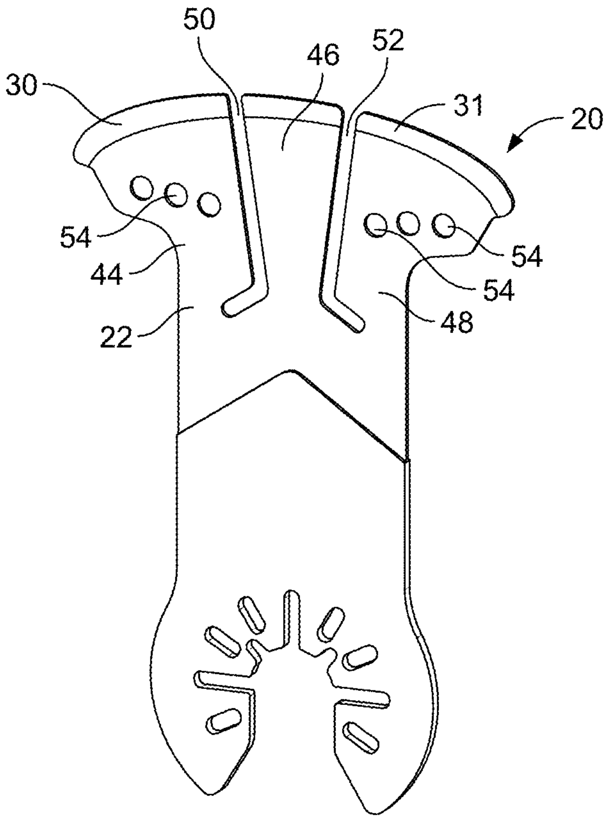
FIG. 3 is a perspective view of a second embodiment of a blade in accordance with the invention.
Figure 4:
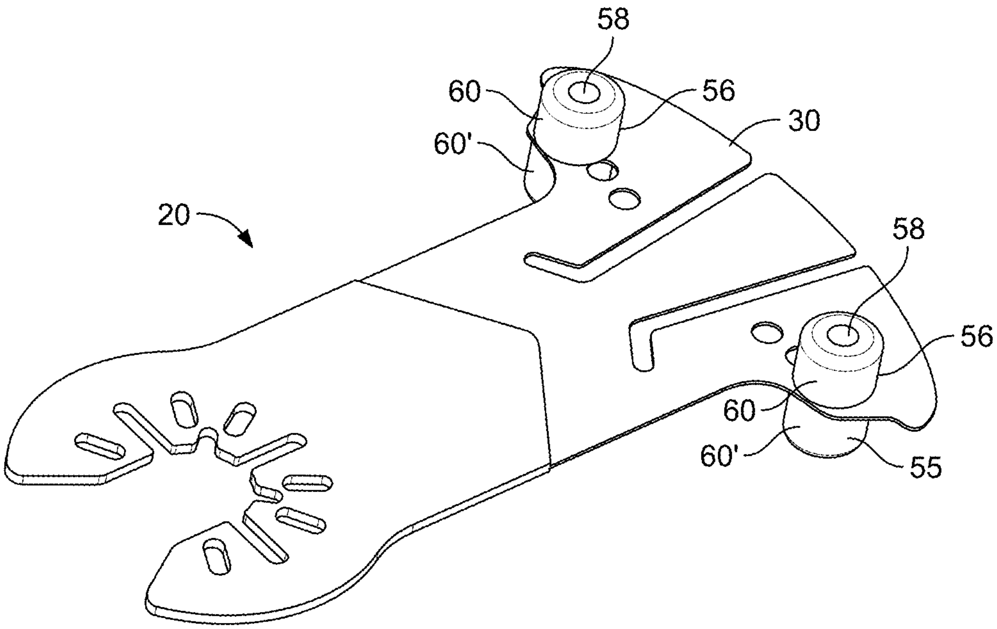
FIG. 4 is a perspective view of the second embodiment with an optional depth stop.

A second embodiment of blade 20 is shown in FIGS. 3 and 4 with three resiliently flexible tongues 44, 46, 48 resulting from elongate body 22 being trisected by two angled slits 50, 52. Outer tongues 44, 48 substantially correspond to the shape of the tongues in the first embodiment, with central tongue 46 substantially triangular in shape. Three apertures 54 formed in each of outer tongues 44, 48 are configured to receive an optional depth stop 55 to limit how far blade 20 can be inserted within a material.

Depth stop 55 comprises a pair of spacer elements 56, each spacer element 56 comprising a central metal pin 58 extending through the tongue portion and on which are mounted a pair of polyurethane cylinders 60, 60', the cylinders disposed respectively on upper and lower faces of each tongue as shown in FIG. 4. The first embodiment as shown in FIG. 2 can also be used with such a depth stop. Apertures 54 are disposed on an angled line so as to allow blade 20 to be inserted to different depths depending on which apertures spacer elements 56 are positioned in.

Depth stop 55 ensures consistency of depth of insertion of the blade into a channel so that a uniform depth of grout, silicone, mortar or other filler material can be removed during operation of tool 10. Each spacer element 56 is located in the aperture corresponding to the required depth of insertion, this being the distance from the aperture to cutting edge 30. If a user wishes to partially remove material to a depth of 2 mm, for example, then an aperture positioned 2 mm below the outer cutting edge 30 of the blade will be selected. In use cylinders 60, 60' will track along a hard surface associated with a filled channel, for example tiles adjacent a channel filled with grout, and so prevent the oscillating blade descending too far into the channel. By using such a depth stop 55, material is removed to a uniform depth ensuring a substrate beneath the material is not damaged and as the old material is removed to a uniform depth, application of replacement filler material is simplified.

Figure 5A:
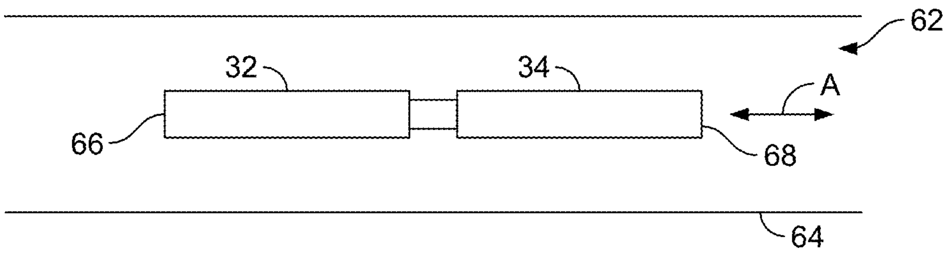
FIGS. 5A and 5B provide an explanatory diagram for describing use of the blade.
Figure 5B:
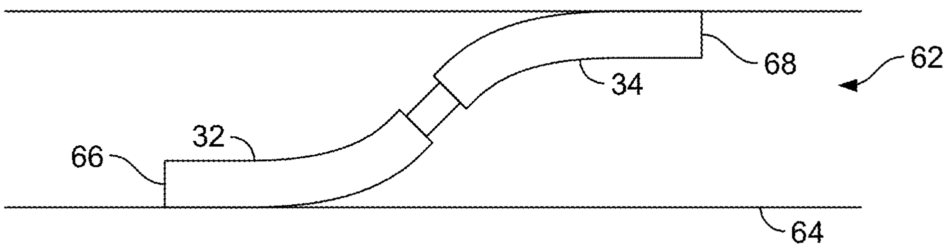

Use of blade 20 to remove grout or other filler material will now be explained using FIGS. 5A and 5B. When tool 10 is used to at least partially remove a substance 62 from a filled channel 64, see FIGS. 5A and 5B, tool 10 is switched on and oscillating blade 20 plunged into channel 64. Typically channel 64 is around 3 mm wide for grout between tiles and around 10 mm for a mortar joint between bricks. Blade 20 oscillates in the direction of arrow A, so substantially parallel to the length of channel 64, see FIG. 5A. The user applies a gentle rotational movement or twist to tool 10 until outer edges 66, 68 of each tongue portion 32, 34, and thus the outer edges of the split outer curved cutting edge 30, engage with opposing channel edges and flex in opposing directions as shown in FIG. 5B. This results in cutting edge 30 extending in a lateral direction across channel 64, rather than just extending linearly in the longitudinal direction of channel 64. This lateral deflection of the tongue portions allows cutting edge 30 to contact material across the channel, instead of just contacting material along the longitudinal length of the channel. In this way the material in the channel, such as such as grouting in a gap between tiles, can be removed in one pass along the channel. This is an improvement over prior art blades used for grout removal where successive passes up and down the channel, adjusting the lateral position of the blade in the channel each time, are required to remove all the grout.

A similar process takes place during use of the blade as shown in FIGS. 3 and 4 with outer tongues 44, 48 flexing as they engage the outer edges of channel 64 and central tongue 46 also flexing to extend at least partially laterally across channel 64.

Figure 6:
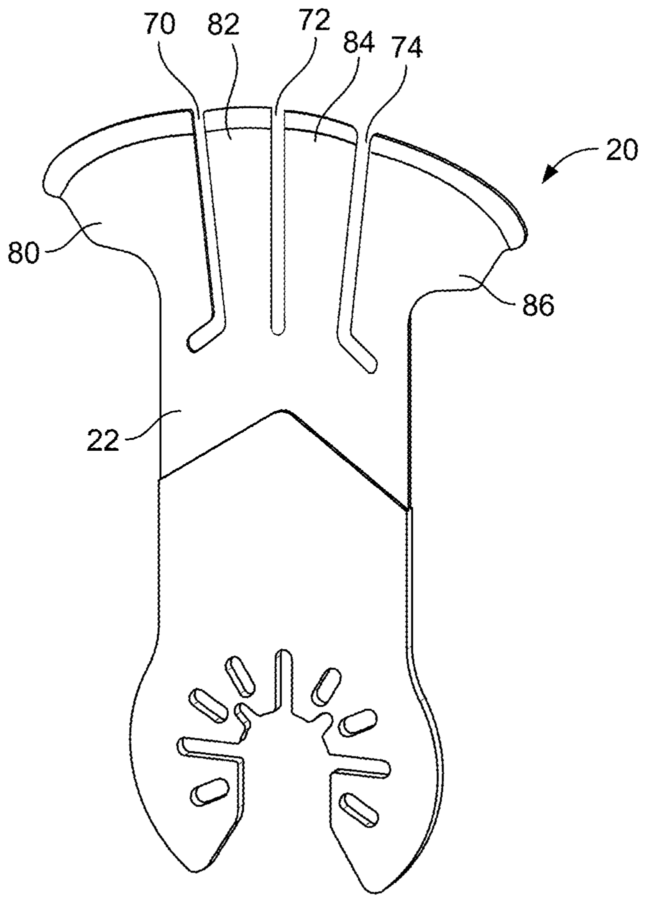
FIG. 6 is a perspective view of a third embodiment of a blade in accordance with the invention.

The dimensions of blade 20 can be adjusted depending on the required use with wider blades used for wider joints such as can be encountered with paving slabs or bricks. For wider blades, and as shown for the second embodiment, preferably a plurality of slits are formed into cutting portion 28 so as to increase the number of tongue portions. Thus, for example, two slits can be used to provide three tongue portions or three slits 70, 72, 74 to provide four tongue portions 80, 82, 84, 86 as shown in FIG. 6.

Blade 20 can be formed as a separate attachment portion and cutting portion with these typically secured together by welding or other types of permanent fixture such as rivets. Alternatively blade 20 can be formed as a single piece.

What is claimed is:

1. A blade for an oscillating power tool, comprising:

a blade body comprising a first major side and a second major side, the second major side being opposite the first major side, wherein the first major side and the second major side define:

an attachment section comprising a first region and a second region, the first region comprising opposing curved edges connecting the first major side and the second major side and the first region including a plurality of apertures arranged in a pattern configured to allow for securing of the attachment section to the oscillating power tool, and the second region comprising first opposing straight edges connecting the first major side and the second major side, the first opposing straight edges being parallel and defining a constant width of the second region;

an elongate body fixed to the attachment section, the elongate body comprising an elongate portion and a cutting portion, the elongate portion comprising second opposing straight edges connecting the first major side and the second major side, the second opposing straight edges being parallel and defining a constant width of the elongate portion, and the cutting portion comprising opposing edges defining an increasing width of the cutting portion;

wherein the elongate body comprises at least one slit that divides the elongate body into two or more resiliently flexible tongue portions, the two or more tongue portions together defining a cutting edge connecting the opposing edges of the cutting portion, the cutting edge being distal from the attachment section; and wherein each slit of the at least one slit comprises a first end and a second end, the first end being at the cutting edge, the second end being in the elongate portion, each slit extending linearly from the first end at least to a location that is positioned laterally and longitudinally between the second opposing straight edges, each slit extending from the first end through the cutting portion to the second end.

2. The blade according to claim 1, wherein the two or more tongue portions are disposed in a common plane.

3. The blade according to claim 1, wherein the elongate body has a longitudinal length extending from the attachment section to the cutting edge of the cutting portion and each of the two or more tongue portions has a length between 30 to 80% of the longitudinal length.

4. The blade according to claim 1, wherein the elongate body comprises a thickness between the first major side and the second major side in a range from 0.5 mm to 3 mm.

5. The blade according to claim 1, wherein the cutting edge extends beyond the opposing edges of the cutting portion and comprises an outer curved cutting edge.

6. The blade according to claim 1, wherein the two or more tongue portions comprise three tongue portions, and wherein the at least one slit comprises two slits to provide the three tongue portions.

7. The blade according to claim 1, wherein the two or more tongue portions comprise four tongue portions, and wherein the at least one slit comprises three slits to provide the four tongue portions.

8. The blade according to claim 1, wherein the cutting edge comprises a circular arc.

9. The blade according to claim 1, wherein the cutting edge comprises abrasive material.

10. The blade according to claim 1 formed from carbon steel.

11. The blade according to claim 1, further comprising a first line of apertures disposed in the cutting portion and a second line of apertures disposed in the cutting portion, wherein apertures of the first and second lines of apertures are each configured to receive a depth stop such that the first line of apertures and the second line of apertures define a plurality of depths for positioning of the cutting edge.

12. The blade according to claim 11, wherein the plurality of depths defined by the first line of apertures and the second line of apertures is at least 3 depths.

13. The blade according to claim 1, wherein a depth stop is attached to the elongate body.

14. The blade according to claim 13, wherein the depth stop comprises a central metal pin extending through a tongue portion of the two or more tongue portions and wherein a pair of polyurethane cylinders are mounted on the pin on the first major surface and the second major surface.

15. The blade according to claim 13, wherein the depth stop is secured to at least two tongue portions of the two or more tongue portions.

16. A method of using an oscillating power tool attached to the blade according to claim 1, the method comprising:

activating the oscillating power tool to oscillate the blade;

inserting the oscillating blade into a channel filled with material; and twisting the oscillating power tool to cause the two or more tongue portions to engage at least opposing walls of the channel.

17. The method of claim 16, wherein, prior to the twisting, the two or more tongue portions are disposed in a common plane and wherein, after the twisting, portions of the two or more tongue portions deflect out of the common plane.

18. The method of claim 16, further comprising attaching one or more depth stops to the elongate body to control a depth into which the blade is inserted into the channel.

19. The method of claim 18, wherein attaching the one or more depth stops to the elongate body further comprises inserting a pin through an aperture in the elongate body and providing cylinders on the pin on opposite sides of the elongate body.

* * * * *